(12) United States Patent
Sehanobish et al.

(10) Patent No.: US 11,472,167 B2
(45) Date of Patent: Oct. 18, 2022

(54) ALL-POLYETHYLENE LAMINATE FILM STRUCTURES HAVING BARRIER ADHESIVE LAYER

(71) Applicant: Dow Global Technologies LLC, Midland, MI (US)

(72) Inventors: Kalyan Sehanobish, Sanford, MI (US); Amira A. Marine, Missouri City, TX (US); Daniele Vinci, Lucerne (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/634,944

(22) PCT Filed: May 9, 2018

(86) PCT No.: PCT/US2018/031722
§ 371 (c)(1),
(2) Date: Jan. 29, 2020

(87) PCT Pub. No.: WO2019/027527
PCT Pub. Date: Feb. 7, 2019

(65) Prior Publication Data
US 2020/0238674 A1    Jul. 30, 2020

Related U.S. Application Data

(60) Provisional application No. 62/539,115, filed on Jul. 31, 2017.

(51) Int. Cl.
*B32B 27/32* (2006.01)
*B32B 7/12* (2006.01)
*B32B 27/08* (2006.01)

(52) U.S. Cl.
CPC ............... *B32B 27/32* (2013.01); *B32B 7/12* (2013.01); *B32B 27/08* (2013.01);
(Continued)

(58) Field of Classification Search
CPC ..... B32B 7/00–14; B32B 27/28; B32B 27/32; B32B 27/08
See application file for complete search history.

(56) References Cited

U.S. PATENT DOCUMENTS 3,726,825 A * 4/1973 Woodward et al. ........................
C08G 18/8012
428/425.1
3,900,424 A    8/1975 Inoue et al.
(Continued)

FOREIGN PATENT DOCUMENTS

EP    1300238 A2 *  4/2003  .......... C08L 23/0815
EP    2149586 A1    2/2010
(Continued)

OTHER PUBLICATIONS

"Serfene 2026 Technical Datasheet". Owensboro Specialty Polymers Inc., (2015).*
(Continued)

*Primary Examiner* — Prashant J Khatri

(57) ABSTRACT

Recyclable, all-polyethylene laminate film structures suitable for use in a flexible packaging are disclosed. The structures comprise a film layer consisting essentially of an ethylene-based polymer and a barrier adhesive layer disposed on a surface of the film layer, wherein the structure has an oxygen transmission rate not greater than 100 $O_2/m^2/$day, measured according to ASTM Method D3985. Recyclable, all-polyethylene laminate film structures suitable for use in a flexible packaging are disclosed comprising (A) a sealant film layer consisting essentially of an ethylene-based polymer, (B) an intermediate film layer consisting essentially of an ethylene-based polymer, (C) a structural film layer consisting essentially of an ethylene-based polymer, and (D) a barrier adhesive layer, wherein the recyclable, all-polyethylene laminate film structure has an oxygen trans-
(Continued)

mission rate not greater than 100 $O_2/m^2/day$, measured according to ASTM Method D3985. Articles comprising the disclosed laminate film structures, such as flexible packaging and stand-up pouches, are also disclosed.

11 Claims, 1 Drawing Sheet

(52) U.S. Cl.
CPC ..... *B32B 2250/242* (2013.01); *B32B 2307/72* (2013.01); *B32B 2307/7244* (2013.01); *B32B 2553/00* (2013.01)

(56) References Cited

U.S. PATENT DOCUMENTS

| | | | |
|---|---|---|---|
| 4,142,021 A | 2/1979 | Dixon et al. | |
| 5,491,011 A | 2/1996 | Pezzoli et al. | |
| 6,124,006 A | 9/2000 | Hekal | |
| 6,358,357 B1 * | 3/2002 | Lamber | B32B 7/12 |
| | | | 156/333 |
| 8,128,782 B2 | 3/2012 | Yonehama et al. | |
| 10,465,053 B2 | 11/2019 | Breed et al. | |
| 10,961,415 B2 | 3/2021 | Vinci et al. | |
| 11,034,138 B2 | 6/2021 | Miyake et al. | |
| 2001/0012868 A1 * | 8/2001 | Chen | H01L 21/6835 |
| | | | 524/539 |
| 2010/0323189 A1 | 12/2010 | Illsley et al. | |
| 2012/0272618 A1 | 11/2012 | Illsley et al. | |
| 2018/0370202 A1 | 12/2018 | Niedersuss et al. | |

FOREIGN PATENT DOCUMENTS

| | | | | |
|---|---|---|---|---|
| WO | 2000066359 | A1 | 11/2000 | |
| WO | 2008143247 | A1 | 11/2008 | |
| WO | WO-2015057444 | A1 * | 4/2015 | ............ B32B 27/36 |
| WO | 2015175871 | A1 | 11/2015 | |
| WO | WO-2017102704 | A1 * | 6/2017 | ............ B32B 27/08 |

OTHER PUBLICATIONS

"Polyethylene (PE) Typical Properties Generic HDPE". UL Prospector; Retrieved Jan. 7, 2021.*
PCT/US2018/031722, International Search Report and Written Opinion dated Aug. 29, 2018.
PCT/US2018/031722, International Preliminary Report on Patentability dated Feb. 13, 2019.

* cited by examiner

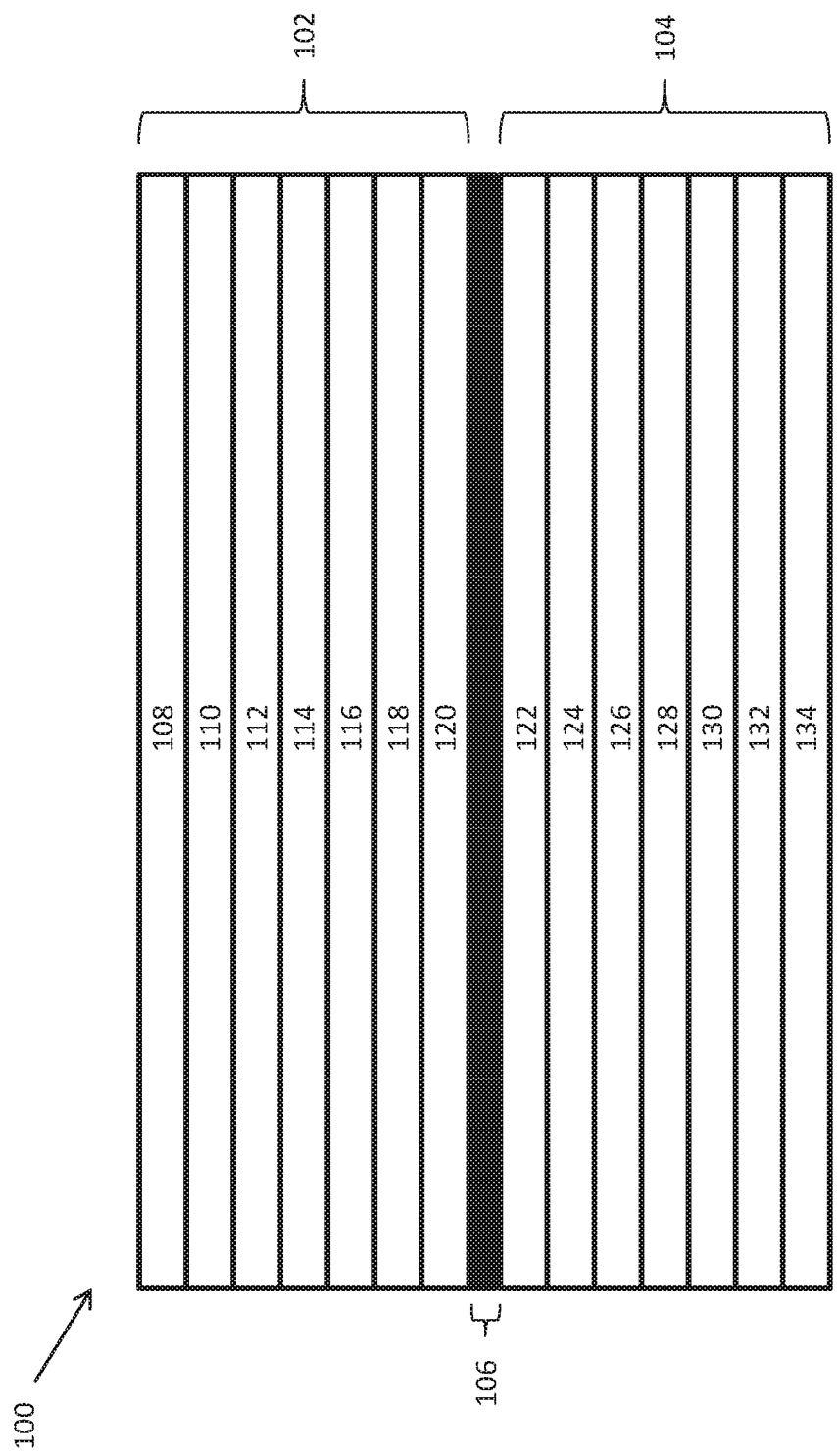

ALL-POLYETHYLENE LAMINATE FILM STRUCTURES HAVING BARRIER ADHESIVE LAYER

REFERENCE TO RELATED APPLICATIONS

The present application claims the benefit of U.S. Provisional Application No. 62/539,115, filed on Jul. 31, 2017.

FIELD OF THE DISCLOSURE

The instant disclosure relates to laminate film structures including an adhesive layer having gas barrier properties. In particular, the disclosed laminate film structures comprise first and second substrates, e.g., films, bonded together with an adhesive composition, the adhesive composition having gas barrier properties. The films used in the disclosed laminate structures consistent essentially of only ethylene-based polymers, thereby enabling recyclable packaging solutions suitable for use in applications requiring gas barrier performance.

BACKGROUND AND SUMMARY OF THE DISCLOSURE

Polymer materials, particularly films comprising polymer materials, are widely used for packaging purposes. These polymer materials find extensive application in the food and drug industries. In these and other uses, exposure of the packaged product to oxygen and/or other gases may be highly undesirable. This is particularly the case where exposure to such gases results in degradation of the packaged product over time. Unfortunately, many polymeric films are inherently relatively permeable to gases. One approach to enhancing gas barrier properties that has been investigated has been to use multiple layers of such polymeric materials, with the layers bonded together with an adhesive to form laminates. In some instances, the polymer material layers and/or the adhesives are selected for gas barrier properties.

Recently, long-term storage of foodstuffs has demanded higher levels of functionality for multilayer films, and gas barrier properties that prevent the penetration of external oxygen in order to inhibit oxidation, carbon dioxide-barrier properties, and barrier properties relative to various odor components are now being demanded. When imparting barrier functions to a multilayer film, the unstretched polyolefin films typically used as the inner layer (on the sealant side) exhibit poor gas barrier properties, and imparting these films with barrier functions by coating or vapor deposition is difficult. As a result, the various films used for the outer layer (including polyester resins such as polyethylene terephthalate (hereafter abbreviated as "PET"), polyamide resins, and stretched polyolefin resins) are often imparted with barrier functions.

In some instances, the film layer itself is imparted with barrier functions. In cases where coating is used to impart these outer layer films with barrier functions, one example of a widely used barrier coating material is vinylidene chloride, which exhibits superior oxygen-barrier properties and water vapor-barrier properties, but there are problems associated with the use of vinylidene chloride, including the generation of dioxin when the material is incinerated during disposal. Further, polyvinyl alcohol resins and ethylene-polyvinyl alcohol copolymers have also been used as barrier coating materials, but although these materials exhibit favorable oxygen-barrier properties under low humidity, they suffer from poor oxygen-barrier properties under high humidity, and inferior boiling resistance and retort resistance. On the other hand, films having a vapor deposited layer of a metal such as aluminum provided as a gas barrier layer are opaque, meaning the internal contents cannot be viewed, and are also unable to be used in microwave ovens. Further, films having a vapor deposited layer of a metal oxide such as silica or alumina provided as a gas barrier layer are expensive, and suffer from poor flexibility, resulting in a large variation in the gas barrier properties due to cracking and pinholes.

Another challenge with food packaging comprising laminate structures made of different types of films is the disposal of such packages. With such packages being made up of mixed plastics and/or metal foils and/or paperboard, the packages are usually discarded as waste due to the incompatibility for recycling of these materials.

It would thus be desirable to have laminate film structures for use in packaging applications that provide necessary gas barrier properties and function and allow ease of recycling.

Recyclable, all-polyethylene laminate film structures having a barrier adhesive layer are disclosed herein. The disclosed laminate film structures are suitable for use in, for example, flexible packaging applications. In particular, the disclosed recyclable, all-polyethylene laminate film structures include a film layer consisting essentially of an ethylene-based polymer and a barrier adhesive layer disposed on a surface of the film layer, wherein the recyclable, all-polyethylene laminate film structure has an oxygen transmission rate not greater than 100 $O_2/m^2$/day, measured according to ASTM Method D3985. In some embodiments, the barrier adhesive layer can comprise a solvent-based adhesive, a water-based adhesive, and/or a solventless adhesive.

In some embodiments, the recyclable, all-polyethylene laminate film structures comprise one or more layers including a sealant film layer consisting essentially of an ethylene-based polymer, an intermediate film layer consisting essentially of an ethylene-based polymer, a structural film layer consisting essentially of an ethylene-based polymer, and a barrier adhesive layer, wherein the recyclable, all-polyethylene laminate film structure has an oxygen transmission rate not greater than 100 $O_2/m^2$/day, measured according to ASTM Method D3985. In some embodiments, the barrier adhesive layer comprises an adhesive comprising an isocyanate component and an isocyanate-reactive component. In some embodiments, the isocyanate component comprises a single species of polyisocyanate. In some embodiments, the isocyanate-reactive component comprises a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below.

Articles comprising the disclosed recyclable, all-polyethylene laminate film structures are also disclosed. In some embodiments, the disclosed articles include, e.g., flexible packages, pouches, stand-up pouches, bags, etc.

The present disclosure provides for laminate structures that advantageously combine ethylene-based films with barrier adhesives that advantageously provide desirable gas transmission properties with an improved compatibility/recyclability profile.

BRIEF DESCRIPTION OF THE DRAWINGS

Reference is made to the accompanying drawings in which:

FIG. 1 illustrates a schematic representation of a recyclable, all-polyethylene laminate structure including a barrier adhesive layer, according to this disclosure.

DETAILED DESCRIPTION OF THE DISCLOSURE

In some embodiments, recyclable, all-polyethylene laminate film structure suitable for use in a flexible packaging are disclosed herein. The disclosed film structures are "all-polyethylene" in that they include only films consisting essentially of ethylene-based polymers. As used herein, "ethylene-based polymer(s)" means polymers comprising greater than 50% by weight of units which have been derived from ethylene monomer. This includes polyethylene homopolymers and interpolymers. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)). Ethylene-based polymers suitable for use in the recyclable, all-polyethylene laminate structures disclosed herein include ethylene homopolymers, long chain branched ethylene polymers, ethylene-alpha-olefin interpolymers where the alpha-olefin moiety can be $C_2$ to $C_{10}$. In particular, ethylene-based polymers suitable for use in the recyclable, all-polyethylene laminate structures disclosed herein include Low Density Polyethylene ("LDPE"); Linear Low Density Polyethylene ("LLDPE"); Ultra Low Density Polyethylene ("ULDPE"); Very Low Density Polyethylene ("VLDPE"); single site catalyzed Linear Low Density Polyethylene, including both linear and substantially linear low density resins ("m-LLDPE"); Medium Density Polyethylene ("MDPE"); and High Density Polyethylene ("HDPE").

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes both resin made using the traditional Ziegler-Natta catalyst systems as well as single-site catalysts such as metallocenes (sometimes referred to as "m-LLDPE") and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.940 g/cm3. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities greater than about 0.940 g/cm3, which are generally prepared with Ziegler-Natta catalysts, chrome catalysts or even metallocene catalysts.

The film structures disclosed herein can be subjected to a secondary machine direction or bi-axial stretching process to provide machine direction oriented or bi-axially oriented structures.

Unless otherwise indicated herein, the following analytical methods are used in the describing aspects of the disclosure:

Melt index: Melt indices $I_2$ and $I_{10}$ are measured in accordance to ASTM D-1238 at 190° C. and at 2.16 kg and 10 kg load, respectively. Their values are reported in g/10 min.

Density: Samples for density measurement are prepared according to ASTM D4703. Measurements are made, according to ASTM D792, Method B, within one hour of sample pressing.

In some embodiments, the laminate film structures comprise a film layer consisting essentially of an ethylene-based polymer and a barrier adhesive layer disposed on a surface of the film layer. In some embodiments, the recyclable, all-polyethylene laminate film structure has an oxygen transmission rate not greater than 100 $O_2/m^2$/day, measured according to ASTM Method D3985. In some embodiments, the barrier adhesive layer comprises a solvent-based adhesive, a water-based adhesive, and/or or a solventless adhesive.

In some embodiments, the all-polyethylene laminate film structures comprise a sealant film layer consisting essentially of an ethylene-based polymer, an intermediate film layer consisting essentially of an ethylene-based polymer, a structural film layer consisting essentially of an ethylene-based polymer, and a barrier adhesive layer. FIG. 1 provides a schematic illustration of a disclosed recyclable, all-polyethylene laminate structure. In FIG. 1, the recyclable, all-polyethylene laminate film structure 100 includes a first film layer 102 bonded to a second film layer 104 by way of a barrier adhesive layer 106. The first film layer 102 and the second film layer 104 are each coextruded film layers comprising multiple films therein. In various embodiments, the first film layer 102 and the second film layer 104 can be coextruded, multi-layer structures, as indicated in FIG. 1, or can be mono-layer films.

In the coextruded, multi-layer structures illustrated in FIG. 1, the first film layer 102 can include a structural film layer 120. The structural film layer 120 can consist essentially of any polyethylene polymer material. In some embodiments, the structural film layer 120 can include an ethylene/octene copolymer material and a LDPE material. In some embodiments, suitable LDPE materials have a density not greater than 0.94 g/cm$^3$ and a peak melting point not greater than 126° C. Suitable ethylene/octene copolymer materials for use according to this disclosure include those sold by The Dow Chemical Company under the ELITE™ name, e.g., ELITE™ 5400G. Suitable LDPE materials for use according to this disclosure include those sold by The Dow Chemical Company under the AGILITY™ name, e.g., AGILITY™ 1021. Structure film layer 120 may further include a slip additive, an anti-block additive, and any other additive suitable for use in a laminate film.

The first film layer 102 can further include one or more intermediate film layers 110, 112, 114, 116, 118. The one or more intermediate film layers 110, 112, 114, 116, 118 can consist essentially of any polyethylene polymer material. In some embodiments, the one or more intermediate film layers 110, 112, 114, 116, 118 can include a HDPE material. In some embodiments, suitable HDPE materials have a density not less than 0.94 g/cm³ and a peak melting point in the range of from 120 to 135° C. Suitable HDPE materials for use according to this disclosure include those sold by The Dow Chemical Company under the ELITE™ name, e.g., ELITE™ 5960G. In some embodiments, the one or more intermediate film layers 110, 112, 114, 116, 118 can include an ethylene/octene copolymer material and a LDPE material.

The first film layer 102 can still further include a sealant layer 108. In some embodiments, the sealant layer 108 can consist essentially of any polyethylene polymer material. In some embodiments, the sealant layer 108 can be a polyolefin plastomer material. Suitable polyolefin plastomer materials for use according to this disclosure include those sold by The Dow Chemical Company under the AFFINITY™ name, e.g., AFFINITY™ 1146G.

As illustrated in FIG. 1, the sealant layer 108 and structural layer 120 form the outer layers of the first film layer 102, and the intermediate layers 110, 112, 114, 116, 118 are disposed between the sealant film layer 108 and the structural film layer 120. The barrier adhesive layer 106 is disposed on a lower surface of the structural film layer 120 in FIG. 1. The second film layer 104 is bonded to the first film layer 102 by way of the barrier adhesive layer 106. The barrier adhesive layer 106 contacts the structural film layer 122 of the second film layer 104. While suitable barrier adhesive layer 106 components are discussed in greater detail below, the barrier adhesive layer 106 can be solvent-based, water-based, or solventless.

In some embodiments, the second film layer 104 is also a coextruded multi-layer film, wherein the individual films layers mirror those of the first film layer 102 (e.g., 122 is a structural film layer, 124, 126, 128, 130, 132 are intermediate film layers, and 134 is a sealant film layer). Each film layer 102, 104 can be a multi-layer film, as illustrated in FIG. 1, or a single layer film. In some embodiments, each film layer 102, 104 is a single-layer film. In some embodiments, one of films layers 102, 104 is a single-layer film while the other film layer is a multi-layer film.

In some embodiments, the barrier adhesive layer 106 includes an adhesive comprising an isocyanate component and an isocyanate-reactive component. In some embodiments, the isocyanate component comprises a single species of polyisocyanate. In some embodiments, the polyisocyanate is an aliphatic polyisocyanate. In some embodiments, the polyisocyanate is selected from polymeric hexamethylene diisocyanate (HDI trimer isocyanurate), methylene diphenyl diisocyanate, dicyclohexylmethane 4,4'-diisocyanate, and toluene diisocyanate.

In some embodiments, the isocyanate-reactive component comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below. In some embodiments, the carrier solvent is selected from ethyl acetate, methyl ethyl ketone, dioxolane, acetone, and combinations thereof. In some embodiments, the hydroxyl-terminated polyester is formed from a $C_3$ to $C_6$ diol and a dicarboxylic acid selected from adipic acid, azelaic acid, sebacic acid, and combinations thereof. In some embodiments, the isocyanate-reactive component further includes an acrylate viscosity modifier.

In some embodiments, the weight ratio of the isocyanate component to the isocyanate-reactive component in the barrier adhesive layer is from 1:1 to 2:1.

Articles comprising the disclosed recyclable, all-polyethylene laminate film structure are also disclosed. In some embodiments, the articles include flexible packaging and stand-up pouches.

Examples of the Disclosure

The present disclosure will now be described in further detail by discussing Illustrative Examples ("IE") and Comparative Examples ("CE") (collectively "the Examples"). However, the scope of the present disclosure is not, of course, limited to the IEs.

The Examples are fabricated using a LABO COMBI™ 400 laminator. The settings on the laminator include a treatment setting of 1 KW, with tensions at 3.6 lbs for the primary, 4.2 lbs for the secondary, and 7.4 lbs for the rewind roller. A barrier adhesive is coated on a multi-layer polyethylene film via gravure cylinder. For the gravure cylinder, a 130 quad with 15 BCM is used. The adhesive is applied at a coating weight of about 3 g/m². The barrier adhesive comprises a crystallizable polyester resin comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below. The barrier adhesive further comprises an aliphatic isocyanate crosslinker.

The coated film is then passed through a three-zoned oven with temperatures set at 90° C. first zone, 100° C. second zone, and 110° C. third zone. The polyethylene film coated with barrier adhesive is then nipped to another multi-layer polyethylene film of the same composition under a heated steel roll at a temperature of 90° C. and a nip pressure set to 40 psi. The laminated structure is then passed to a chill roll of a temperature of 17° C. The laminate structure is then placed in a temperature control room to cure at 23° C. and 50% relative humidity for 7 days.

Illustrative Example 1 is a laminate structure including two multi-layered film structures each having 7 film layers. In particular, each structure includes a sealant layer comprising 95 wt % AFFINITY™ 1146G with the remaining weight including slip additive, a filler layer adjacent to and in contact with the sealant layer and comprising 85 wt % ELITE™ 5400G, and 15 wt % AGILITY™ 1021, a first filler layer adjacent to and in contact with the sealant layer and comprising 100 wt % ELITE™ 5960G, a second filler layer adjacent to and in contact with the first filler layer and comprising 100 wt % ELITE™ 5960G, a third filler layer adjacent to and in contact with the second filler layer and comprising 100 wt % ELITE™ 5960G, a fourth filler layer adjacent to and in contact with the third filler layer and comprising 100 wt % ELITE™ 5960G, and a structural layer adjacent to and in contact with the fourth filler layer and comprising 82 wt % ELITE™ 5400G, 15 wt % AGILITY™ 1021 with the remaining weight including slip additive. A solvent-based polyurethane barrier adhesive prepared in accordance with the disclosure above is applied to the structural layer of one of the two multi-layered film structures. The film structures are then bonded together such that the sealant layers of each film structure seal the laminate.

Illustrative Example 2 is a pouch formed using the laminate structure of Illustrative Example 1.

Comparative Example 1 is a plain polyethylene film, having no barrier adhesive.

The oxygen transmission rates of the laminated structures are tested according to the methods outlined in ASTM Method D3985 (Standard Test Method for Oxygen Gas Transmission Rate through a Plastic Film and Sheeting Using a Coulometric Sensor). The permeability of the laminated structures are tested according to methods outlined in ASTM Method D3985.

Oxygen barrier properties are measured for the laminate structures and the permeability is compared. The performance results of the laminate structures are detailed in Table 1.

TABLE 1

| Example | OTR (cc $O_2/m^2/d$) | Thickness (µm) | Permeability (cc $O_2$ · microns/ $m^2/d$) |
| --- | --- | --- | --- |
| Illustrative Example 1 | 85 | 164 | 13,940 |
| Illustrative Example 2 | 69 | 164 | 11,316 |
| Comparative Example 1 | 913 | 81 | 73,953 |

In addition to the embodiments described above and those set forth in the Examples, many embodiments of specific combinations are within the scope of the disclosure, some of which are described below:

Embodiment 1. A recyclable, all-polyethylene laminate film structure suitable for use in a flexible packaging, comprising:
 a film layer consisting essentially of an ethylene-based polymer; and
 a barrier adhesive layer disposed on a surface of the film layer,
  wherein the recyclable, all-polyethylene laminate film structure has an oxygen transmission rate not greater than 100 $O_2/m^2/day$, measured according to ASTM Method D3985.

Embodiment 2. The recyclable, all-polyethylene laminate film structure according to any preceding or succeeding Embodiment, wherein the barrier adhesive layer comprises a solvent-based adhesive.

Embodiment 3. The recyclable, all-polyethylene laminate film structure according to any preceding or succeeding Embodiment, wherein the barrier adhesive layer comprises a water-based adhesive.

Embodiment 4. The recyclable, all-polyethylene laminate film structure according to any preceding or succeeding Embodiment, wherein the barrier adhesive layer comprises a solventless adhesive.

Embodiment 5. A recyclable, all-polyethylene laminate film structure suitable for use in a flexible packaging, comprising:
 (A) a sealant film layer consisting essentially of an ethylene-based polymer;
 (B) an intermediate film layer consisting essentially of an ethylene-based polymer;
 (C) a structural film layer consisting essentially of an ethylene-based polymer; and
 (D) a barrier adhesive layer,
  wherein the recyclable, all-polyethylene laminate film structure has an oxygen transmission rate not greater than 100 $O_2/m^2/day$, measured according to ASTM Method D3985.

Embodiment 6. The recyclable, all-polyethylene laminate film structure according to any preceding or succeeding Embodiment, wherein the sealant film layer (A), intermediate film layer (B), and structural film layer (C) form a coextruded film wherein the intermediate film layer (B) is disposed between the sealant film layer (A) and the structural film layer (C), and wherein the barrier adhesive layer (D) is disposed on a surface of the structural film layer (C) opposite the intermediate film layer (B).

Embodiment 7. The recyclable, all-polyethylene laminate film structure according to Embodiment 6, wherein the barrier adhesive layer (D) is in contact with another film layer (E) opposite the structural film layer (A).

Embodiment 8. The recyclable, all-polyethylene laminate film structure according to any preceding or succeeding Embodiment, the structure comprising more than one intermediate film layer (B).

Embodiment 9. A recyclable, all-polyethylene laminate film structure suitable for use in a flexible packaging, comprising:
 (A) a sealant film layer consisting essentially of an ethylene/octene interpolymer and a low density polyethylene;
 (B) an intermediate film layer consisting essentially of a high density polyethylene;
 (C) a structural film layer consistently essentially of an ethylene/octene interpolymer and a low density polyethylene; and
 (D) a barrier adhesive layer,
  wherein the recyclable, all-polyethylene laminate film structure has an oxygen transmission rate not greater than 100 $O_2/m^2/day$, measured according to ASTM Method D3985.

Embodiment 10. The recyclable, all-polyethylene laminate film structure suitable for use in a flexible packaging, wherein the low density polyethylene has a density not greater than 0.94 g/cm³ and a peak melting point not greater than 126° C.

Embodiment 11. The recyclable, all-polyethylene laminate film structure suitable for use in a flexible packaging, wherein the high density polyethylene has a density not less than 0.94 g/cm³ and a peak melting point in the range of from 120 to 135° C.

Embodiment 12. The recyclable, all-polyethylene laminate film structure according to any preceding or succeeding Embodiment, wherein the sealant film layer (A), intermediate film layer (B), and structural film layer (C) form a coextruded film wherein the intermediate film layer (B) is disposed between the sealant film layer (A) and the structural film layer (C), and wherein the barrier adhesive layer (D) is disposed on a surface of the structural film layer (C) opposite the intermediate film layer (B).

Embodiment 13. The recyclable, all-polyethylene laminate film structure according to any preceding or succeeding Embodiment, wherein the barrier adhesive layer (D) is in contact with another film layer (E) opposite the structural film layer (A).

Embodiment 14. The recyclable, all-polyethylene laminate film structure according to any preceding or succeeding Embodiment, the structure comprising more than one intermediate film layer (B).

Embodiment 15. The recyclable, all-polyethylene laminate film structure according to any preceding or succeeding Embodiment, wherein the barrier adhesive layer (D) comprises an adhesive comprising:
an isocyanate component comprising a single species of polyisocyanate; and
an isocyanate-reactive component comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below.

Embodiment 16. The recyclable, all-polyethylene laminate film structure according to any preceding or succeeding Embodiment, wherein the hydroxyl-terminated polyester is formed from a C3 to C6 diol and a dicarboxylic acid selected from adipic acid, azelaic acid, sebacic acid, and combinations thereof.

Embodiment 17. The recyclable, all-polyethylene laminate film structure according to any preceding or succeeding Embodiment, wherein the polyisocyanate is selected from polymeric hexamethylene diisocyanate (HDI trimer isocyanurate), methylene diphenyl diisocyanate, dicyclohexylmethane 4,4'-diisocyanate, and toluene diisocyanate.

Embodiment 18. The recyclable, all-polyethylene laminate film structure according to any preceding or succeeding Embodiment, wherein the carrier solvent is selected from ethyl acetate, methyl ethyl ketone, dioxolane, acetone, and combinations thereof.

Embodiment 19. The recyclable, all-polyethylene laminate film structure according to any preceding or succeeding Embodiment, wherein the isocyanate-reactive component further comprises an acrylate viscosity modifier.

Embodiment 20. The recyclable, all-polyethylene laminate film structure according to any preceding or succeeding Embodiment, wherein the ratio of the isocyanate component to the isocyanate-reactive component in the barrier adhesive layer is from 1:1 to 2:1.

Embodiment 21. An article comprising the recyclable, all-polyethylene laminate film structure according to any preceding or succeeding Embodiment.

Embodiment 22. The article of Embodiment 21, wherein the article is a flexible package.

Embodiment 23. The article of Embodiment 21, wherein the article is a stand-up pouch.

What is claimed is:

1. A recyclable, all-polyethylene laminate structure suitable for use in a flexible packaging, consisting of:
(A) a sealant film layer consisting essentially of an ethylene-based polymer;
(B) an intermediate film layer consisting essentially of an ethylene-based polymer;
(C) a structural film layer consisting essentially of an ethylene-based polymer; and
(D) a barrier adhesive layer, wherein the barrier adhesive layer (D) comprises an adhesive comprising:
an isocyanate component comprising a single species of polyisocyanate; and
an isocyanate-reactive component comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below;
wherein the recyclable, all-polyethylene laminate structure has an oxygen transmission rate not greater than 100 cc $O_2/m^2$/day, measured according to ASTM Method D3985.

2. The recyclable, all-polyethylene laminate structure suitable for use in a flexible packaging of claim 1, wherein:
(A) the sealant film layer consists essentially of an ethylene/octene interpolymer and a low density polyethylene;
(B) the intermediate film layer consists essentially of a high density polyethylene; and
(C) the structural film layer consists essentially of an ethylene/octene interpolymer and a low density polyethylene.

3. The recyclable, all-polyethylene laminate structure suitable for use in a flexible packaging according to claim 2, wherein the low density polyethylene has a density not greater than 0.94 g/cm$^3$ and a peak melting point not greater than 126° C.

4. The recyclable, all-polyethylene laminate structure suitable for use in a flexible packaging according to claim 2, wherein the high density polyethylene has a density not less than 0.94 g/cm$^3$ and a peak melting point in the range of from 120 to 135° C.

5. The recyclable, all-polyethylene laminate structure according to claim 2, wherein the sealant film layer (A), intermediate film layer (B), and structural film layer (C) form a coextruded film wherein the intermediate film layer (B) is disposed between the sealant film layer (A) and the structural film layer (C), and wherein the barrier adhesive layer (D) is disposed on a surface of the structural film layer (C) opposite the intermediate film layer (B).

6. The recyclable, all-polyethylene laminate structure according to claim 2, wherein the barrier adhesive layer (D) is in contact with another film layer (E) opposite the structural film layer (C).

7. The recyclable, all-polyethylene laminate structure according to claim 2, the structure comprising more than one intermediate film layer (B).

8. The recyclable, all-polyethylene laminate structure according to claim 2, wherein the polyisocyanate is selected from polymeric hexamethylene diisocyanate (HDI trimer isocyanurate), methylene diphenyl diisocyanate, dicyclohexylmethane 4,4'-diisocyanate, and toluene diisocyanate.

9. The recyclable, all-polyethylene laminate structure according to claim 2, wherein the carrier solvent is selected from ethyl acetate, methyl ethyl ketone, dioxolane, acetone, and combinations thereof.

10. The recyclable, all-polyethylene laminate structure according to claim 2, wherein the isocyanate-reactive component further comprises an acrylate viscosity modifier.

11. The recyclable, all-polyethylene laminate structure according to claim 2, wherein the ratio of the isocyanate component to the isocyanate-reactive component in the barrier adhesive layer is from 1:1 to 2:1.

* * * * *